April 26, 1949.
G. H. BAUSMAN
2,468,285
PISTON ROD PACKING
Filed July 18, 1946
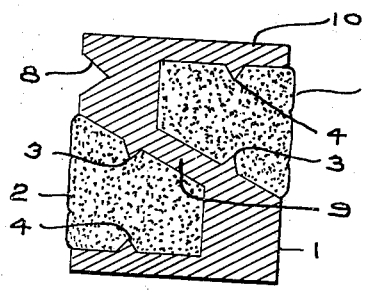
FIG. 1.
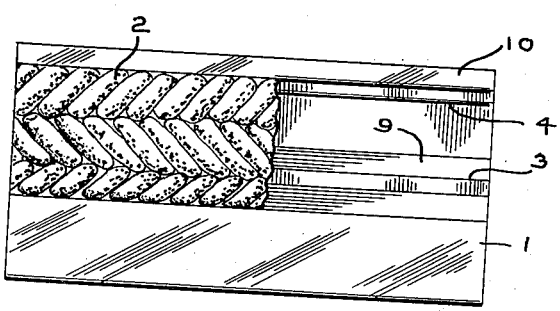
FIG. 2.
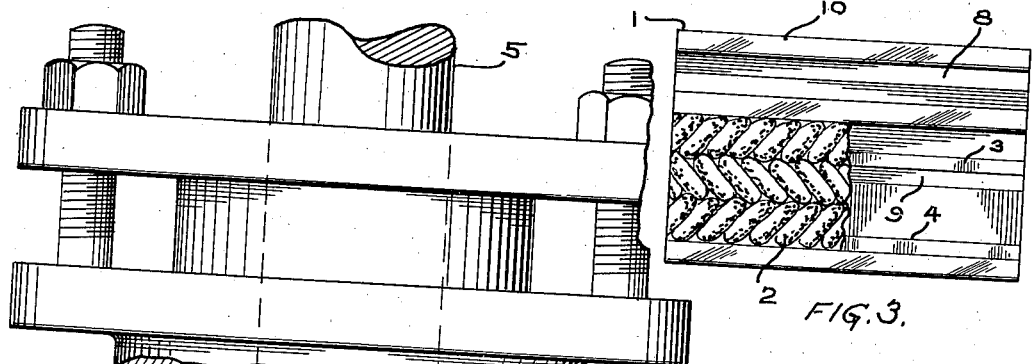
FIG. 3.
FIG. 4.
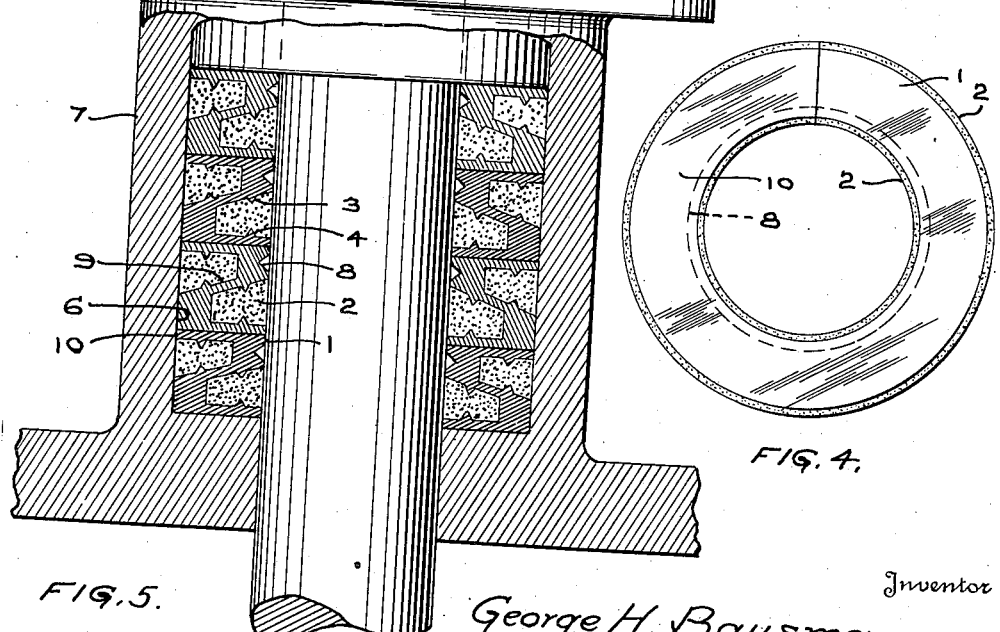
FIG. 5.
Inventor
George H. Bausman.
By Thomas W. J. Clark
Attorney
Witness
Porter H. Flautt Patented Apr. 26, 1949

2,468,285

UNITED STATES PATENT OFFICE 2,468,285

PISTON ROD PACKING

George H. Bausman, Baltimore, Md.

Application July 18, 1946, Serial No. 684,479

1 Claim. (Cl. 288—9)

This invention relates to a combination metal and fibre packing for the piston rods of steam engines, water pumps, pumps for handling oil or acids or other material, for air compressors, refrigerating machines and other machines in which acids, oils and highly volatile liquids as well as water may be involved. The packing surfaces of the packing ring are formed in part of soft packing, making a soft contact with the cylindrical surfaces of the packing gland or stuffing box on one side and with the piston rod on the other side, thus completely eliminating all leakage of any of the above described materials around the piston rod and through the gland or box. The soft packing will vary in character according to the material with which the invention is used.

The invention is an improvement over the packing of the Bausman Patent 1,779,225, October 21, 1930. Specifically the improvement is designed ot hold the lubricating oil on the packing, which oil is otherwise floating on the piston rod and perhaps escaping from the packing and piston rod. To this end the improvement consists of a small circumferential groove directed toward the piston rod and being in the metallic ring adjacent the soft packing through which the piston rod passes.

Other objects and advantages of the invention will be apparent from the following description and the accompanying drawings forming a part hereof and in which:

Figure 1 is a cross-sectional view of a piston rod packing involving this invention.

Figure 2 is an outside elevation thereof showing part of the soft packing removed.

Figure 3 is a similar inside elevational view thereof.

Figure 4 is a top plan view thereof.

Figure 5 is a view of the packing assembled with a packing gland on the machine with the piston rod therethrough.

In the drawing similar numerals refer to similar parts throughout the several views.

The packing consists of a metallic strip 1 having Z shape cross-section. In each side opening of the Z, a soft packing strip 2 is firmly held by projecting points 3 and 4 on the inside of the side openings of the Z, thus a complete rectangular cross-sectioned member is obtained with metal on the top and bottom and with the soft packing and metal on each side, forming bearings and holding surfaces for both the piston 5 and the material being operated upon by the piston.

As shown in Figure 1, it is preferable that initially the soft packing project slightly from the metallic ring. In practice however the soft packing and the metallic packing contact both the piston rod and the inner gland wall 6 of gland 7, thus protecting the soft packing from the action of the material being operated upon by the piston on all sides. It has been found in practice that the lubricating oil tends to escape or flow from the piston rod and a V shape groove 8 is shown cut or otherwise formed into the inner wall of the metallic ring 1 to hold the oil on the rod in one direction of the stroke of the rod, and in the other direction of stroke of the rod to distribute the oil to the adjacent soft packing, thus not only keeping the packing lubricated but also keeping it tighter in preventing the passage through the gland of the ffuid operated upon by the piston.

As shown in applicant's earlier patent, above referred to, the packing is initially made in a straight section and the side groove, at the back of one angle of the Z is placed in the inner metal wearing surface prior to bending the straight section into a ring, and the groove weakens the inner metal wearing surface in bending to facilitate the formation, upon bending, of a straight inner cylindrical metal and soft packing surface and an over-all cylindrical form for the packing, lacking distortion of the inner cylindrical surface because of the inward bending of the back of one angle of the Z and because of the difference in the quantity of metal at the top and bottom of the Z shaped cross-section.

It will be apparent that when the packing is placed within the gland and around the piston rod as shown in Figure 5, that should the packing near the piston rod leak, the gland may be tightened to force the packing together vertically and thereby force the soft packing from the metallic ring horizontally, thereby to maintain the tightness of the packing. It will be apparent that in this tightening the diagonal cross member 9 of the Z and the top 10 of the Z will tend to become parallel so that with additional tightening the groove 8 rather than disappearing with wear will tend to open as a mouth to maintain the existence of the groove to perform its designated purpose. Thus the groove will be maintained in any state of wear of the packing in the gland and it will continue to keep the oil on the piston in the packing, in contact with the reciprocating piston, and keep the soft packing saturated and efficient and prolong its life.

What is claimed as new and desired to be secured by Letters Patent is:

A semi-metallic piston rod packing for an annular packing gland, the packing being in the form of a ring and having inner and outer cylindrical walls, the inner wall encircling the piston rod and the outer wall closely fitting in the packing gland, the ring comprising a metal strip of Z shaped cross-section forming oppositely disposed tapered grooves of outwardly increasing dimension toward the inner and outer cylindrical walls and soft packing in the grooves forming inner and outer cylindrical wearing surfaces each consisting of soft packing and metal, the soft packing being, except for said wearing surfaces, completely enclosed by the metal, the back of the angle of the Z on the inner cylindrical wall, forming an inner metal wearing surface and having therein a circumferential groove opening inwardly toward the piston rod and to wipe lubricant from the piston rod and hold it therein on movement of the piston rod, and on the reverse piston rod stroke, to supply lubricant to the piston rod and to the soft packing adjacent the lubricant groove.

GEORGE H. BAUSMAN.

REFERENCES CITED

The following references are of record in the file of this patent:

UNITED STATES PATENTS

| Number | Name | Date |
|---|---|---|
| 669,318 | Caumont | Mar. 5, 1901 |
| 1,646,356 | Johnson | Oct. 18, 1927 |
| 1,779,225 | Bausman | Oct. 21, 1930 |
| 1,964,272 | Payne | June 26, 1934 |